(12) United States Patent
Ryu et al.

(10) Patent No.: US 8,920,912 B2
(45) Date of Patent: Dec. 30, 2014

(54) MULTILAYER STRUCTURED TRANSPARENT ELECTRICALLY-CONDUCTIVE FILM AND METHOD OF MANUFACTURING THE SAME

(75) Inventors: Sang Uk Ryu, Daejeon (KR); Dong Ryul Kim, Daejeon (KR); Jang Yeon Hwang, Seoul (KR); Hyeon Woo Jang, Daejeon (KR); Bon Suk Koo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/178,365

(22) Filed: Jul. 7, 2011

(65) Prior Publication Data

US 2011/0281092 A1  Nov. 17, 2011

Related U.S. Application Data

(63) Continuation of application No. PCT/KR2011/003551, filed on May 13, 2011.

(30) Foreign Application Priority Data

May 13, 2010 (KR) .......................... 10-2010-0044859

(51) Int. Cl.
| | |
|---|---|
| B32B 7/02 | (2006.01) |
| B32B 27/08 | (2006.01) |
| B32B 7/12 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |

(52) U.S. Cl.
CPC . *B32B 27/08* (2013.01); *B32B 7/02* (2013.01); *B32B 7/12* (2013.01); *B32B 27/281* (2013.01); *B32B 27/285* (2013.01); *B32B 27/286* (2013.01); *B32B 27/302* (2013.01); *B32B 27/32* (2013.01); *B32B 27/34* (2013.01); *B32B 27/365* (2013.01); *B32B 2307/202* (2013.01)
USPC .......................................................... 428/212

(58) Field of Classification Search
USPC .......................................................... 428/212
See application file for complete search history.

(56) References Cited

U.S. PATENT DOCUMENTS

| | | | | |
|---|---|---|---|---|
| 2002/0158853 | A1* | 10/2002 | Sugawara et al. | 345/176 |
| 2007/0278949 | A1* | 12/2007 | Smith et al. | 313/512 |
| 2009/0002323 | A1* | 1/2009 | Shiroishi et al. | 345/173 |
| 2010/0136276 | A1* | 6/2010 | Andou et al. | 428/41.8 |

FOREIGN PATENT DOCUMENTS

| | | |
|---|---|---|
| CN | 1886809 A | 12/2006 |
| JP | 2002-326301 | 11/2002 |
| JP | 2004-152727 | 5/2004 |
| JP | 2006-139750 | 6/2006 |
| JP | 2006-261091 | 9/2006 |
| JP | 2008-181838 | 8/2008 |
| KR | 1020050004165 A | 1/2005 |

\* cited by examiner

*Primary Examiner* — Aaron Austin
*Assistant Examiner* — Tahseen N Khan
(74) *Attorney, Agent, or Firm* — Mckenna Long & Aldridge LLP

(57) ABSTRACT

The present invention relates to a transparent electrically-conductive film comprising a substrate having a refractive index of n1, a first coating layer having a refractive index of n2, a second coating layer having a refractive index of n3, and an electrically-conductive oxide layer having a refractive index of n4 in a sequentially laminated form, wherein said refractive index of each layer complies with $n1 \leq n3 < n2 < n4$, and a method of preparing the same.

The transparent electrically-conductive film according to the present invention has especially excellent color feeling and mechanical property as well as excellent transmittance.

15 Claims, No Drawings

MULTILAYER STRUCTURED TRANSPARENT ELECTRICALLY-CONDUCTIVE FILM AND METHOD OF MANUFACTURING THE SAME

This application is a Continuation application (bypass application), under 35 USC §120, of International Patent Application No. PCT/KR2011/003551, filed on May 13, 2011, which claims priority to Korean Application No. 10-2010-0044859, filed on May 13, 2010, which is incorporated by reference in its entirety herein.

TECHNICAL FIELD

The present invention relates to a transparent electrically-conductive film having excellent color feeling and mechanical property as well as excellent transmittance.

BACKGROUND ART

Although an electrically conductive glass having an indium oxide thin film formed on a glass substrate was used as conventional transparent electrically-conductive films, said electrically-conductive glass had poor flexibility and workability, since the substrate is glass, and was not desirable, in many cases, depending on uses. In response to this, transparent electrically-conductive films that various plastic films, including polyethylene terephthalate films, having impact resistance and being capable of reducing weight as well as having excellent flexibility and workability are applied thereto, as a substrate, have been commercially used.

However, since the transparent electrically-conductive film as above to which the plastic film is applied as a substrate has high light reflectance in a surface of an indium oxide thin film, there is a problem that transmittance is lowered, color feeling (b*) is lowered and mechanical property is lowered.

A value of said b* is a value of measuring a degree that a film is yellowish, wherein the value is higher, the film looks to be more yellowed. Preferably, the value is lower in use of a touch panel.

To lower said b*, the reflection in a wavelength range of 400 to 500 nm should be minimized, and to simultaneously maintain high total light transmittance together with a lower b* value, design of a layer having a refractive index suitable for this is required.

DISCLOSURE

Technical Problem

Therefore, the present invention is intended to provide a transparent electrically-conductive film having excellent color feeling and mechanical property as well as excellent transmittance, and a method of preparing the same.

Technical Solution

The present invention provides a transparent electrically-conductive film comprising a substrate having a refractive index of n1, a first coating layer having a refractive index of n2, a second coating layer having a refractive index of n3, and an electrically-conductive oxide layer having a refractive index of n4 in a sequentially laminated form, wherein said refractive index of each layer complies with $n1 \leq n3 < n2 < n4$.

In addition, the present invention provides a touch panel comprising said transparent electrically-conductive film.

Furthermore, the present invention provides a method of preparing a transparent electrically-conductive film comprising a step of sequentially laminating a substrate having a refractive index of n1, a first coating layer having a refractive index of n2, a second coating layer having a refractive index of n3, and an electrically-conductive oxide layer having a refractive index of n4, wherein said refractive index of each layer complies with $n1 \leq n3 < n2 < n4$.

Advantageous Effects

The present transparent electrically-conductive film has especially excellent color feeling and mechanical property as well as excellent transmittance.

BEST MODE

The present invention is explained in more detail below.

The present invention is characterized in that a transparent electrically-conductive film comprising a substrate having a refractive index of n1, a first coating layer having a refractive index of n2, a second coating layer having a refractive index of n3, and an electrically-conductive oxide layer having a refractive index of n4 in a sequentially laminated form, said refractive index of each layer complies with $n1 \leq n3 < n2 < n4$. In addition, to improve mechanical property of the transparent electrically-conductive film, a transparent pressure sensitive adhesive and a second substrate having at least on one side a coating which is capable of improving physical property may be sequentially laminated on the opposite side of the substrate having the electrically-conductive oxide layer.

Although said substrate is not particularly limited, a plastic film having transparency may be used. A specific example thereof includes a polyester resin, a cellulose ester resin, a polyether sulfone resin, a polycarbonate resin, a polyamide resin, a polyimide resin, a polyolefin resin, a (meth)acrylic resin, a polyvinyl chloride resin, a polyvinylidene chloride resin, a polystyrene resin, a polyvinyl alcohol resin, a polyacrylate resin, a polyphenylene sulfide resin, and the like.

A refractive index of said substrate is preferably 1.4 to 1.7.

In addition, a thickness of said substrate is preferably 2 to 200 μm. If said thickness of the substrate is less than 2 μm, the mechanical property as a substrate may be deteriorated. If it is more than 200 μm, sensitivity of touch may be lowered on preparing a touch panel.

Furthermore, to improve coatability and adhesion of the coating layer, a surface of said substrate may be subjected to sputtering, corona discharge, ultraviolet irradiation, acid/base treatment, primer treatment, and the like.

For said first and second coating layers, an organic material, an inorganic material, or an organic-inorganic composite may be used regardless of its kind, as long as each layer complies with the refractive index relationship. As said organic material, resins consisting of heat or UV curable organic materials may be used, which includes acrylic, urethane, thiourethane, melamine, alkyd resins, siloxane-based polymers, and the like. Said inorganic material includes $CaF_3$, $BaF_2$, SiO, $LaF_3$, CeF, $Al_2O_3$, silicon oxynitride, aluminum oxynitride, and the like.

The organic-inorganic composite may be used by selecting at least one from acrylic, urethane, thiourethane, melamine, alkyd resins, siloxane-based polymers, organic silane compounds represented by the following chemical formula 1 comprising high refractive particles of a single composition or a combined composition of $TiO_2$, $Nb_2O_5$, $Ta_2O_5$, $Sb_2O_5$, $ZrO_2$, ZnO, ZnS, and the like. Here, when the organic silane compound is used, it is mixed with high refractive particles and has to be capable of regulating a refractive index and crosslinking.

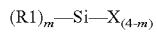   [[Chemical Formula 1]]

wherein, X may be identical or different from each other and represents hydrogen, halogen, alkoxy having 1 to 12 carbon atoms, acyloxy, alkylcarbonyl, alkoxycarbonyl, or $N(R2)_2$ (where, R2 represents H, or alkyl having 1 to 12 carbon atoms), R1 may be identical or different from each other and represents alkyl having 1 to 12 carbon atoms, alkenyl, alkynyl, aryl, arylalkyl, alkylaryl, arylalkenyl, alkenylaryl, arylalkynyl, alkynylaryl, halogen, substituted amino, amide, aldehyde, keto, alkylcarbonyl, carboxy, mercapto, cyano, hydroxy, alkoxy having 1 to 12 carbon atoms, alkoxycarbonyl having 1 to 12 carbon atoms, sulfonic acid, phosphoric acid, acryloxy, methacryloxy, epoxy or vinyl, or oxygen or —NR2 (where, R2 represents H or alkyl having 1 to 12 carbon atoms) may be inserted between the radical R1 and Si to be $-(R1)_m-O-Si-X_{(4-m)}$ or $-(R1)_m-NR2-Si-X_{(4-m)}$, and m represents an integer of 1 to 3.

An example of said organic silane includes methyltrimethoxysilane, methyltriethoxysilane, phenyltrimethoxysilane, phenyltriethoxysilane, dimethyldimethoxysilane, dimethyldiethoxysilane, diphenyldimethoxysilane, diphenyldiethoxysilane, phenyldimethoxysilane, phenyldiethoxysilane, methyldimethoxysilane, methyldiethoxysilane, phenylmethyldimethoxysilane, phenylmethyldiethoxysilane, trimethylmethoxysilane, trimethylethoxysilane, triphenylmethoxysilane, triphenylethoxysilane, phenyldimethylmethoxysilane, phenyldimethylethoxysilane, diphenylmethylmethoxysilane, diphenylmethylethoxysilane, dimethylmethoxysilane, dimethylethoxysilane, diphenylmethoxysilane, diphenylethoxysilane, 3-aminopropyltriethoxysilane, 3-glycidoxypropyltrimethoxysilane, p-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrimethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane, and the like.

When the organic-inorganic composite layer is used for said first and second coating layers, the amount of the organic material is, preferably, 1% by weight or more, and, more preferably, 5% by weight or more. In addition, the amount of said inorganic material may be used in 0.01 to 99% by weight, and more preferably less than 95% by weight. Preferably, the refractive index of said first coating layer is higher than that of the transparent substrate or the second coating layer and lower than that of the electrically-conductive oxide layer, specifically 1.5 to 2.

Furthermore, the thickness of said first coating layer is, preferably, 10 nm or more, and more preferably, 10 to 1,000 nm. If the thickness of said first coating layer is more than 1,000 nm, it is apprehended that it will be difficult to improve transparency and surface cracks be caused.

The refractive index of said second coating layer is preferably higher than that of the substrate and lower than that of the first coating layer, specifically 1.4 to 1.9.

In addition, the thickness of said second coating layer is preferably 10 to 500 nm. If the thickness of said second coating layer is more than 500 nm, it is apprehended that it will not comply with excellent transparency and b* at the same time and cracks on the surface be easily caused.

As said electrically-conductive oxide layer, an ITO, a zinc oxide-based thin film (Zn:M) doped with an element M, and the like may be used. Said element M is a dopant element, which may be an element of Group 13 or a transition metal with an oxidation state of +3. A nonrestrictive example of said element M includes B, Al, Ga, In, Tl, Sc, V, Cr, Mn, Fe, Co or Ni, and the like. Preferably, aluminum (Al) or gallium (Ga), and the like may be used.

The refractive index of said electrically-conductive oxide layer is preferably 1.9 to 2.3, and the thickness of the electrically-conductive oxide layer is preferably 5 to 200 nm. If the thickness of said electrically-conductive oxide layer is less than 5 nm, it is difficult to embody a sheet resistance for using it as a touch panel. If it is more than 200 nm, it is apprehended that it will be difficult to improve transmittance and color feeling (b*) and cracks be caused.

In addition, the transparent electrically-conductive film according to the present invention can also include a transparent electrically-conductive film in a form that a second substrate is attached to the other direction side of the substrate on which the first coating layer, the second coating layer and the electrically-conductive oxide layer are sequentially formed, using a transparent pressure sensitive adhesive.

In adhesion of said second substrate, a pressure sensitive adhesive layer may be prepared toward the second substrate to attach the electrically-conductive film thereto, and conversely, the pressure sensitive adhesive layer be also prepared toward the substrate to attach the second substrate.

Said pressure sensitive adhesive may be used without limitation, as long as it has transparency. For example, acrylic pressure sensitive adhesives, silicone-based pressure sensitive adhesive, rubber-based pressure sensitive adhesive, and the like may be used. For example, acrylic pressure sensitive adhesives, silicone pressure sensitive adhesives, rubber pressure sensitive adhesives, and the like may be used. The pressure sensitive adhesive layer may improve scratch resistance of the electrically-conductive oxide layer in the transparent electrically-conductive film or beating point characteristics for a touch panel by a cushion effect after attaching the second substrate thereto. To enhance said scratch resistance or beating point characteristics more, said pressure sensitive adhesive layer may have an elastic coefficient of 1 to 100 $N/cm^2$ and a thickness of at least 1 μm, preferably 5 to 100 μm.

If the elastic coefficient of said pressure sensitive adhesive layer is less than 1 $N/cm^2$, the pressure sensitive adhesive layer becomes inelastic, so that it may be easily modified by applying pressure, unevenness be caused on the electrically-conductive oxide layer in the transparent electrically-conductive film, the adhesive be protruded at a processed cutting plane and the effect for enhancing scratch resistance of the electrically-conductive oxide layer or beating point characteristics for a touch panel be reduced. In addition, if the elastic coefficient is more than 100 $N/cm^2$, the cushion effect in the pressure sensitive adhesive layer cannot be anticipated, so that the effect for enhancing scratch resistance of the electrically-conductive oxide layer or beating point characteristics for a touch panel may be reduced.

Furthermore, if the thickness of the pressure sensitive adhesive layer is less than 1 μm, the cushion effect in the pressure sensitive adhesive layer cannot be anticipated, so that the effect for enhancing scratch resistance of the electrically-conductive oxide layer or beating point characteristics for a touch panel may be reduced. If it is more than 100 μm, the transparency is deteriorated, or it is disadvantageous in terms of formation of the pressure sensitive adhesive layer, adhesion of the second substrate and costs.

Said second substrate to be attached using said pressure sensitive adhesive layer can give the transparent electrically-conductive film mechanical strength and prevent from causing curl.

Following attaching said second substrate, if flexibility in the transparent electrically-conductive film is required, a plastic film having a thickness of 6 to 3,000 μm may be used as said second substrate; if flexibility is not particularly required, plat glasses or plastics having a thickness of 0.05 to 10 mm may be used.

In the plastics which may be used as said second substrate, the same materials as those of the substrate in the transparent electrically-conductive film may be used.

Said second substrate may comprise at least on one side one or more selected from the group consisting of an antifouling coating layer intending to prevent from contamination, a hard coating layer intending to protect an external surface, a low reflecting coating layer for improving visibility and an antireflective coating layer and thus improve physical property of the transparent electrically-conductive film.

The transparent electrically-conductive film according to the present invention has an advantage that may simultaneously embody high transmittance and excellent color feeling (b*). In one example, said transparent electrically-conductive film can simultaneously comply with a total light transmittance of 88% or more and a b* value of 2.0 or less. In another example, said transparent electrically-conductive film can simultaneously comply with a total light transmittance of 90% or more and a b* value of 1.5 or less. The total light transmittance (% Tt) is a value of measuring the amount of light to permeate a film, and means the higher the total light transmittance, the more excellent the light transmittance. In addition, the value of color feeling (b*) is one of measuring the degree of being yellowish in the film. The higher the value, the film looks to be more yellowed, so that it is preferred for the value to be lower for embodying excellent color feeling.

Furthermore, the present invention provides a method of preparing a transparent electrically-conductive film comprising a step of sequentially laminating a substrate having a refractive index of n1, a first coating layer having a refractive index of n2, a second coating layer having a refractive index of n3, and an electrically-conductive oxide layer having a refractive index of n4, wherein said refractive index of each layer complies with n1≤n3<n2<n4.

As a method of sequentially forming the first coating layer, the second coating layer and the transparent electrically-conductive oxide layer on said substrate, vacuum depositing, sputtering, ion plating, coating or chemical vapor depositing (CVD), and the like, may be used, but general methods known in this field may be used, without being surely limited thereto.

In addition, the present invention provides a touch panel comprising said transparent electrically-conductive film. Especially, it may be used in touch panels, such as PDAs, notebooks, OA·FA appliances, ATMs, cellular phones, and navigations, and applied to all fields that transparent electrodes are used.

Furthermore, the transparent electrically-conductive film according to the present invention may be used in displays such as LCDs, OLEDs, and e-papers or OLED illumination, and the like.

MODE FOR INVENTION

The present invention is explained in more detail through examples below. However, the following examples illustrate only the present invention, of which the scope is not limited thereto.

Example 1

On a polyethylene terephthalate film (refractive index 1.6) having a thickness of 25 μm, an acrylic coating liquid comprising $TiO_2$ was coated, dried at 100° C. for 1 minute, and then irradiated with UV in a light intensity of 400 mJ/cm$^2$ to form a first coating layer (refractive index 1.80) having a thickness of 70 nm, and an acrylic coating liquid comprising $ZrO_2$ nanoparticles was coated, dried at 100° C. for 1 minute, and then irradiated with UV in a light intensity of 400 mJ/cm$^2$ to form a second coating layer (refractive index 1.63) having a thickness of 45 nm in order. Subsequently, an ITO layer having a thickness of 30 nm was vapor deposited using sputtering in an atmosphere of 5 mTorr consisting of argon gas 98.4% and oxygen gas 1.6% to prepare a transparent electrically-conductive film.

Example 2

The transparent electrically-conductive film was prepared by the same method as Example 1 except that the second coating layer in the above Example 1 was one having a refractive index of 1.65 and a thickness of 45 nm obtained by drying an acrylic coating liquid, wherein the amount of $ZrO_2$ nanoparticles was regulated, at 100° C. for 1 minute and irradiating it with UV in a light intensity of 400 mJ/cm$^2$.

Example 3

The transparent electrically-conductive film was prepared by the same method as Example 1 except that as the second coating layer in the above Example 1, one having a refractive index of 1.61 and a thickness of 45 nm obtained by preparing a coating liquid and drying it at 50° C. for 3 minutes and at 120° C. for 10 minutes, was used, wherein the coating liquid was obtained by the processes such that an organic silane was diluted in ethanol to be 20% by weight, distilled water was introduced thereto in an amount of 1.5 times as that of alkoxysilane group, a catalytic quantity of hydrochloric acid was poured thereto and reacted at 25° C. for 24 hours to make a sol solution and $Sb_2O_5$ nanoparticles were introduced thereto and diluted to be 2% by weight.

Comparative Example 1

The transparent electrically-conductive film was prepared by the same method as Example 1 except that in the above Example 1, the first coating layer (refractive index 1.46) having a thickness of 145 nm was used and the second coating layer had a refractive index of 1.80 and a thickness of 50 nm.

Said first coating layer having a refractive index of 1.46 and a thickness of 145 nm was formed by adding an acid catalyst to a mixture of an organic silane:tetraethoxysilane:ethyl alcohol:distilled water (=1:6:7:2, ratio by weight) and partially hydrolyzing the mixture at 25° C. for 24 hours to prepare a composition in a sol state, coating the composition on said substrate and drying solvents at 60° C. for 1 minute, followed by proceeding gel reaction in a convection oven at 140° C. for 3 minutes.

Comparative Example 2

The transparent electrically-conductive film was prepared by the same method as Example 1 except that the second coating layer in the above Example 1 was not coated.

Comparative Example 3

The transparent electrically-conductive film was prepared by the same method as Example 1 except that in the above Example 1, a substrate having a refractive index of 1.65 was used, the first coating layer had a refractive index of 1.80 and a thickness of 80 nm and the second coating layer had a refractive index of 1.46 and a thickness of 80 nm.

Experimental Example

The total light transmittance (% Tt) was measured using Total Light of Hazemeter (JIS K 7105), and the results were represented in Table 1 below.
Measurement of b* Value
The value of said b* is one of measuring the degree of being yellowish in the film. The higher the value, the film looks to be more yellowed, so that it is preferred for the value to be lower in use of a touch panel. To measure the b*, SHIMAZU UV-VIS-NIR spectrophotometer (UV-3600) was utilized, and the results were represented in Table 1 below.

TABLE 1

|  | Total Light Transmittance (% Tt) | Color Feeling (b* value) |
|---|---|---|
| Example 1 | 90.1 | 1.1 |
| Example 2 | 90.2 | 0.8 |
| Example 3 | 90.4 | 1.3 |
| Comparative Example 1 | 82.5 | 1.62 |
| Comparative Example 2 | 83.9 | −1.72 |
| Comparative Example 3 | 90.7 | 6.17 |

As can be seen from the above Table 1, the transparent electrically-conductive films according to Examples 1 to 3 of the present invention comply simultaneously with a total light transmittance of 88% or more and a b* value of 2.0 or less, and thus it can be noted that they have excellent color feeling as well as excellent transmittance.

INDUSTRIAL APPLICABILITY

The transparent electrically-conductive films according to the present invention have especially excellent color feeling and mechanical property as well as excellent transmittance, and may be utilized in various type touch panels, displays or illumination fields.

The invention claimed is:

1. A transparent electrically-conductive film comprising a second substrate, a transparent pressure sensitive adhesive, a substrate having a refractive index of n1, a first coating layer having a refractive index of n2, a second coating layer having a refractive index of n3, and an electrically-conductive oxide layer having a refractive index of n4 in a sequentially laminated form,
wherein,
said refractive index of each layer complies with $n1 \leq n3 < n2 < n4$,
the substrate has a refractive index of 1.6 and a thickness of 25 μm,
the first coating layer has a refractive index of 1.8 and a thickness of 70 nm,
the second coating layer has a refractive index of 1.61 to 1.65 and a thickness of 45 nm,
the transparent electrically-conductive film has a total light transmittance of 88% or more and a color feeling (b*) of 2 or less, and
the pressure sensitive adhesive layer has an elastic coefficient of 1 to 100 N/cm$^2$ and a thickness of 5 to 100 μm, and the second substrate has a thickness of 6 to 3,000 μm.

2. A touch panel comprising a transparent electrically-conductive film according to claim 1.

3. The transparent electrically-conductive film according to claim 1, characterized in that said substrate is a polyester resin, a cellulose ester resin, a polyether sulfone resin, a polycarbonate resin, a polyamide resin, a polyimide resin, a polyolefin resin, a (meth)acrylic resin, a polyvinyl chloride resin, a polyvinylidene chloride resin, a polystyrene resin, a polyvinyl alcohol resin, a polyacrylate resin, or a polyphenylene sulfide resin, which have transparency.

4. A touch panel comprising a transparent electrically-conductive film according to claim 3.

5. The transparent electrically-conductive film according to claim 1, characterized in that said first coating layer is an organic material, an inorganic material or an organic-inorganic composite.

6. A touch panel comprising a transparent electrically-conductive film according to claim 5.

7. The transparent electrically-conductive film according to claim 1, characterized in that said second coating layer is an organic material, an inorganic material or an organic-inorganic composite.

8. A touch panel comprising a transparent electrically-conductive film according to claim 7.

9. The transparent electrically-conductive film according to claim 1, characterized in that said electrically-conductive oxide layer is an ITO or a zinc oxide thin film (ZnO: M) doped with an element M, wherein said M is an element of Group 13 or a transition metal with an oxidation state of +3.

10. A touch panel comprising a transparent electrically-conductive film according to claim 9.

11. The transparent electrically-conductive film according to claim 1, characterized in that said electrically-conductive oxide layer has a thickness of 5 to 200 nm.

12. A touch panel comprising a transparent electrically-conductive film according to claim 11.

13. The transparent electrically-conductive film according to claim 1, further comprising at least on one side of said second substrate one or more functional layers selected from the group consisting of an antifouling coating layer, a hard coating layer, a low reflecting coating layer and an antireflective coating layer.

14. A touch panel comprising a transparent electrically-conductive film according to claim 13.

15. A method of preparing a transparent electrically-conductive film comprising steps of laminating a second substrate, a transparent pressure sensitive adhesive, a substrate having a refractive index of n1, a first coating layer having a refractive index of n2, a second coating layer having a refractive index of n3, and an electrically-conductive oxide layer having a refractive index of n4 in a sequentially laminated form,
wherein,
said refractive index of each layer complies with $n1 \leq n3 < n2 < n4$, the substrate has a refractive index of 1.6 and a thickness of 25 μm, the first coating layer has a refractive index of 1.8 and a thickness of 70 nm, the second coating layer has a refractive index of 1.61 to 1.65 and a thickness of 45 nm, the transparent electrically-conductive film has a total light transmittance of 88% or more and a color feeling (b*) of 2 or less, and the pressure sensitive adhesive layer has an elastic coefficient of 1 to 100 N/cm$^2$ and a thickness of 5 to 100 μm, and the second substrate has a thickness of 6 to 3,000 μm.

\* \* \* \* \*